Sept. 24, 1963 — V. D. ROOSA — 3,105,042
FILTER ASSEMBLY
Filed Oct. 18, 1960 — 4 Sheets-Sheet 1

INVENTOR.
VERNON D. ROOSA
BY
Lindsey, Prutzman and Hayes
ATTORNEYS

Sept. 24, 1963 V. D. ROOSA 3,105,042
FILTER ASSEMBLY
Filed Oct. 18, 1960 4 Sheets-Sheet 2

INVENTOR.
VERNON D. ROOSA
BY
Lindsey, Prutzman and Hayes
ATTORNEYS

Sept. 24, 1963                V. D. ROOSA                3,105,042
                              FILTER ASSEMBLY Filed Oct. 18, 1960                                      4 Sheets-Sheet 3

INVENTOR.
VERNON D. ROOSA
BY
Lindsey, Crutzman and Hayes
ATTORNEYS

Sept. 24, 1963 V. D. ROOSA 3,105,042
FILTER ASSEMBLY
Filed Oct. 18, 1960 4 Sheets-Sheet 4

INVENTOR.
VERNON D. ROOSA
BY
Lindsey, Brutzman and Hayes
ATTORNEYS

United States Patent Office 3,105,042
Patented Sept. 24, 1963

3,105,042
FILTER ASSEMBLY
Vernon D. Roosa, % Hartford Machine Screw Co.,
P.O. Box 1440, West Hartford 2, Conn.
Filed Oct. 18, 1960, Ser. No. 63,376
5 Claims. (Cl. 210—94)

This invention relates generally to an improved filter assembly and is more specifically concerned with an improved liquid fuel filter assembly of the type used in the fuel feed system of internal combustion engines, particularly diesel engines of the fuel injection type.

In fuel systems of the type shown in my prior Patent No. 2,821,183 entitled "Fuel Injection Means for Internal Combustion Engines," leak-off lines are provided from the fuel pump and fuel injection nozzles to the fuel tank through which leakage or excess fuel is returned to the main tank. In addition, these lines serve to purge air from the fuel system, which air may have entered the fuel system through minute leaks during periods of time when the engine is not operating. Such a return line principle has been found in great assistance to various types of hydraulic mechanisms as well as liquid fuel systems, but in certain applications, introduces unwanted complexity and additional sources of possible air leakage.

It is, therefore, a general object of the present invention to provide a filter assembly of the type having a replaceable filter cartridge, which assembly reduces opportunities for fluid leakage while simplifying the fluid return piping and effectively removing both water and air from the filtered fluid.

A further object of this invention is to provide an improved filter assembly that visibly indicates the quantity of accumulated water taken from the filtered fluid and which permits simple drainage of that accumulated water without impairing the operation of the filter and associated fluid system.

Another object of this invention is to provide a fluid filter assembly suitable for direct mounting on the supply tank of a fluid supply system.

A still further object of this invention is the provision of a filter assembly of the type described that can easily be converted from an assembly using a single replaceable filter cartridge to one which uses two such cartridges of identical or different types.

It is an additional object of this invention to provide an improved filter and valve assembly of the replaceable filter cartridge type, which assembly is effective in operation, economical to manufacture and extremely simple to service by unskilled mechanics.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
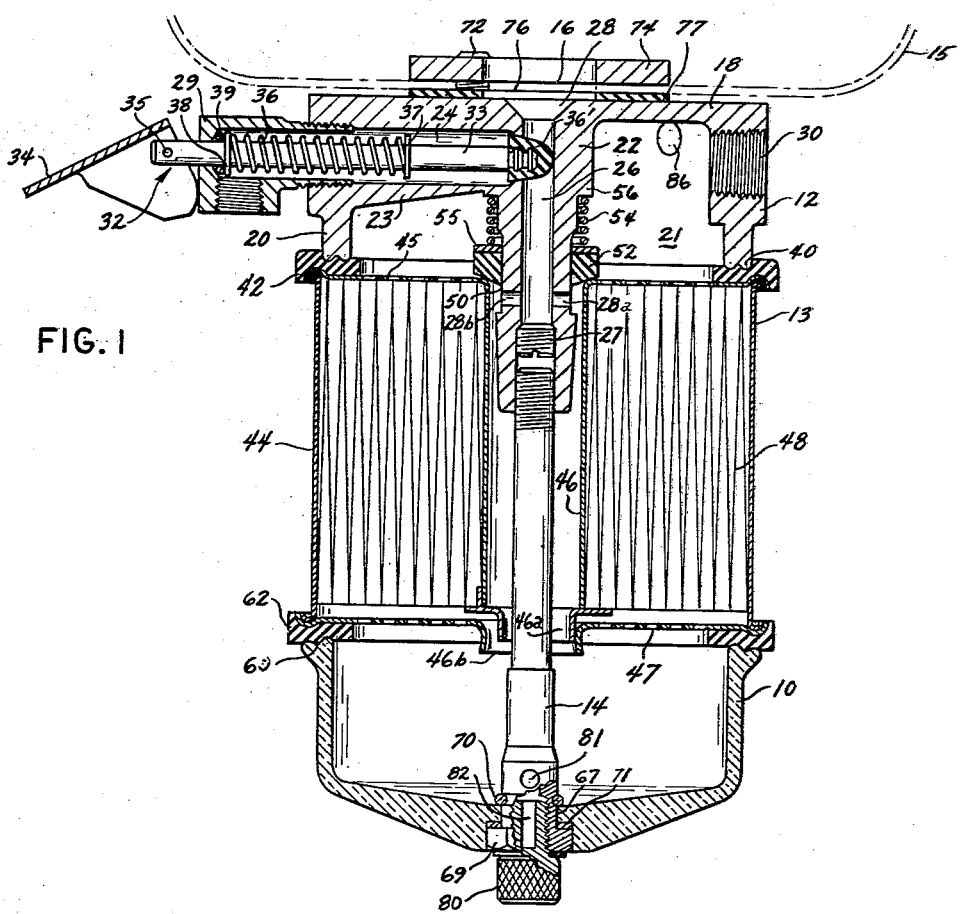
FIG. 1 is a vertical cross section view taken along the central axis of a preferred embodiment of my improved filter assembly with a portion of the fuel tank shown in phantom.

Referring first to FIG. 1, it is seen that one embodiment of my improved filter assembly generally comprises a bowl-like bottom end cap 10, a base 12 and a form-sustaining, replaceable filter cartridge 13 held together by fastening member 14 and fastened directly to fuel tank 15 (partially shown in phantom).

Base 12 is preferably an integral metallic casting having a substantially flat top portion 18 from which peripheral rim 20 and central boss or hub 22 extend downwardly to define generally annular chamber 21. Radial rib 23 extends from hub 22 to rim 20 and is provided with a fluid return passageway 24 which is internally threaded at its outer end and which communicates at its inner end with fluid inlet passageway 26 formed in hub 22. The upper end of passageway 26 is outwardly flared at 28 for connection to the tank as hereinafter explained and the lower end thereof is closed by threaded stud 27 at a point below outlet ports 28a and 28b. Passageway 24 has attached at its outer end the L-shaped fitting 29 which forms an elbow for connection to an excess or leakage fuel return line such as the type disclosed in my aforementioned Patent No. 2,821,183. An outlet opening 30 is provided in rim 20 and is internally threaded for connection to the line leading to the fuel pump of such a system.

To effect simultaneous closure of fluid return passageway 24 and inlet passageway 26 so that the assembly can be dismantled without fuel leakage, there is provided the valve assembly generally designated 32. Valve assembly 32 includes a plunger 33 of substantially smaller diameter than passageway 24 and extending throughout the length thereof. Plunger 33 passes through an aperture in elbow 29 and pivotally engages L-shaped valve operating lever 34 at point 35. The inner end of plunger 33 has connected thereto a soft, rounded nose member 36' which is dimensioned to be compressible into sealing engagement with the sidewalls of passageway 26 and the sidewalls of the inner end of passageway 24 which are slightly reduced in diameter in the preferred embodiment. Plunger 33 is urged inwardly towards passageway 26 by spring 36 which is compressed between washer 37 affixed to plunger 33 and washer 38 abutting outer end of passageway 24. Washer 38 also engages O-ring 39 to assist in effecting a seal between plunger 33 and elbow 29. Nose number 36' is dimensioned so that when plunger 33 is withdrawn by depressing operating lever 34 fluid can easily pass through passageway 24 and around member 36' into passageway 26.

Lower edge 40 of downwardly extending peripheral rim 20 on base 12 is grooved to define an irregular surface that engages the compressible gasket 42 attached to the outer peripheral rim of filter cartridge 13. A typical filter cartridge for use with my improved filter assembly generally comprises an imperforate outer cylindrical shell 44 to which is attached a perforated upper end plate 45 having a downwardly extending centrally located cylindrical tubelike stem 46 which terminates in flange 46a disposed in rim 46b. Perforated bottom plate 47 is attached to shell 44 to define a container that is generally annular in shape and is filled with an appropriate filter material, schematically shown at 48. Hub 22 of base 12 is dimensioned to extend well into the passageway defined by tubular stem 46 of filter 13 and is provided with a portion 50 of reduced diameter about which is slidably disposed a filter seal grommet 52 that is urged downwardly by spring 54 acting against washer 55 and shoulder 56 to sealingly engage the upper end of stem 46.

End cap 10 is formed of glass or any suitable transparent material (although, of course, metal can be used) and acts as a sediment bowl and water collection receptacle. Cap 10 is generally bowl-shaped and is provided with sidewalls whose upper edges are grooved at 60 to facilitate sealing engagement with packing ring 62 on the lower peripheral edge of the filter cartridge. Cap 10 and cartridge 13 are secured to base 12 by bolt-like fastening member 14 whose upper end passes through tubular stem 46 and threadably engages the lower end of hub 22. In the illustrated embodiment aperture 67 in bowl 10 through which member 14 passes, is provided with a generally hexagonal sidewall and a shoulder to engage the hexagonal head 69 so that rotation of bowl 10 causes rotation of member 14. O-ring 70 and packing seal 71 provide the necessary sealing engagement between member 14 and bowl 10.

The entire filter assembly is secured to the bottom of a fuel tank by the cooperation of threaded fasteners 72 (one of which is shown in FIG. 1) which threadably engages base 12 and mounting flange 74. Flange 74 is positioned internally of tank 15 and has a central aperture which is aligned with aperture 76 in tank 15 and passageway 26 in base 12. Gasket 77 provides the necessary fluid seal.

Further advantages and objects of the first-described embodiment of my filter assembly can best be understood from a description of the operation thereof. With valve 32 opened (lever 34 depressed, plunger 33 retracted), fluid will pass from tank 15 through aperture 76 into inlet passageway 26 in base 12 and outwardly from passageway 26 through ports 28a and 28b and into the central stem 46 of filter cartridge 13. The liquid flows down through stem 46 into bowl 10 from which it passes upwardly through perforated end plate 47 and into filter material 48. The fluid is forced through the filter material and passes upwardly through perforated end plate 45 of filter cartridge 13 into chamber 21 and out through output port 30 to the engine fuel pump or the like. Any water that accumulates in tank 15 will pass down through inlet passageway 26 and collect in bowl 10, which because of its transparent construction affords clear visible indication of the quantity of water contained therein. The accumulated water can be drained from bowl 10 by unscrewing knurled drain plug 80 thereby permitting water to pass through lateral passageway 81, drainage passageway 82 and out of the fuel system without necessitating dismantling of the filter assembly or other interruption in operation of the fluid system.

As the engine of the system shown in my aforementioned patent is cranked, air and moisture that may have collected within the fuel pump and other portions of the fuel system are returned to the tank and filter assembly by a return line connected to return passageway 24. Passageways 24 and 26, because of their straight construction, permit the air to pass upwardly into the fuel tank without becoming trapped in the passageways to impede the flow of fuel in the system and the water passes downwardly to collect in bowl 10 as heretofore described. Any air that accumulates in chamber 21 can be vented through air vent screw 85 which communicates with the interior of chamber 21 through passageway 86.

To disassemble my filter assembly for replacement of the filter cartridge, it is merely necessary to close valve 32 and rotate bowl 10 to remove fastener 14. The old cartridge is then removed, the new cartridge is placed in position, fastener 14 is rotated into the hub to clamp bowl 10, the new cartridge and base 12 in operative relationship. Spring loading of filter seal 52 accommodates dimensional inaccuracy and misalignment of the filter cartridge and insures proper sealing engagement. If desired and as illustrated in FIG. 1, seal 52 acts to close ports 28a and 28b when the cartridge is removed thereby acting as a safety valve to close the fluid inlet passageway if bowl 10 is removed without first closing valve 32.

Figure 2:
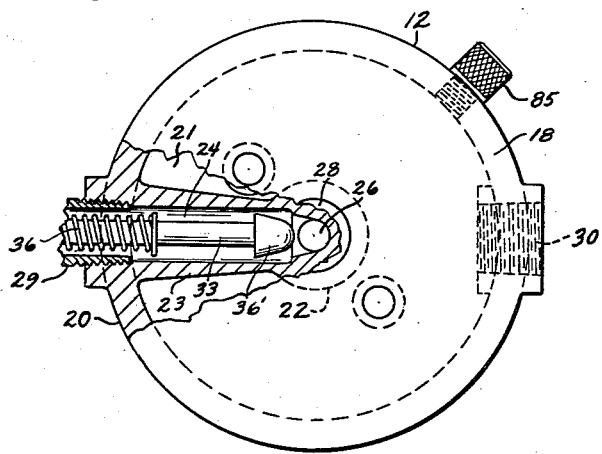
FIG. 2 is a top plan view of the filter assembly shown in FIG. 1 with a portion of the base cut away to show details of the valve mechanism.
Figure 3:
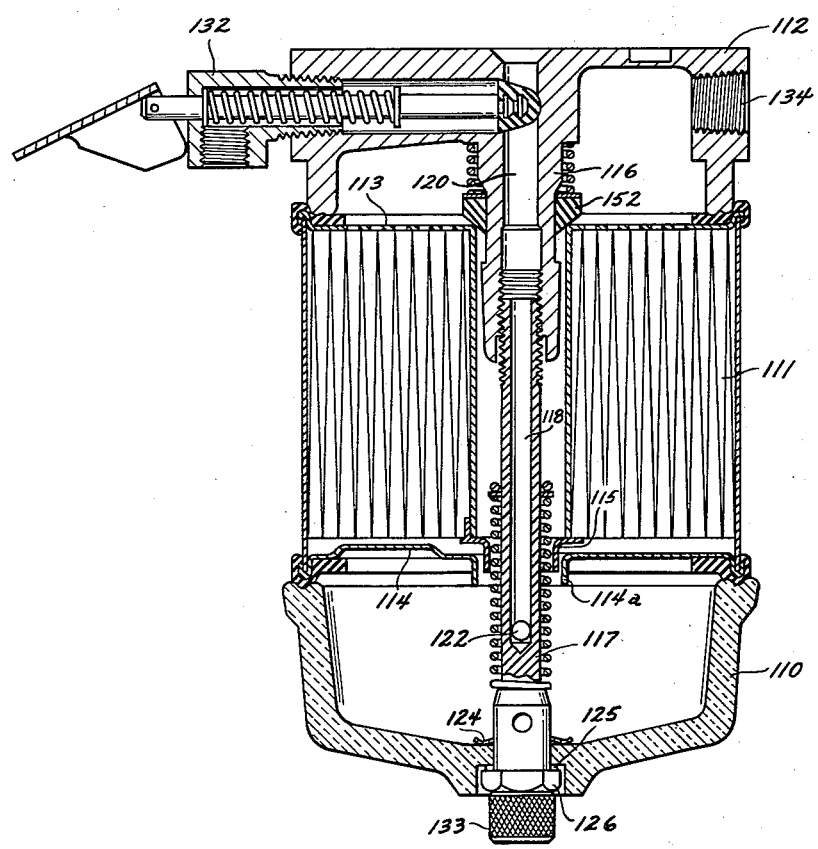
FIG. 3 is a vertical cross section view of an alternative embodiment of my invention.
Figure 4:
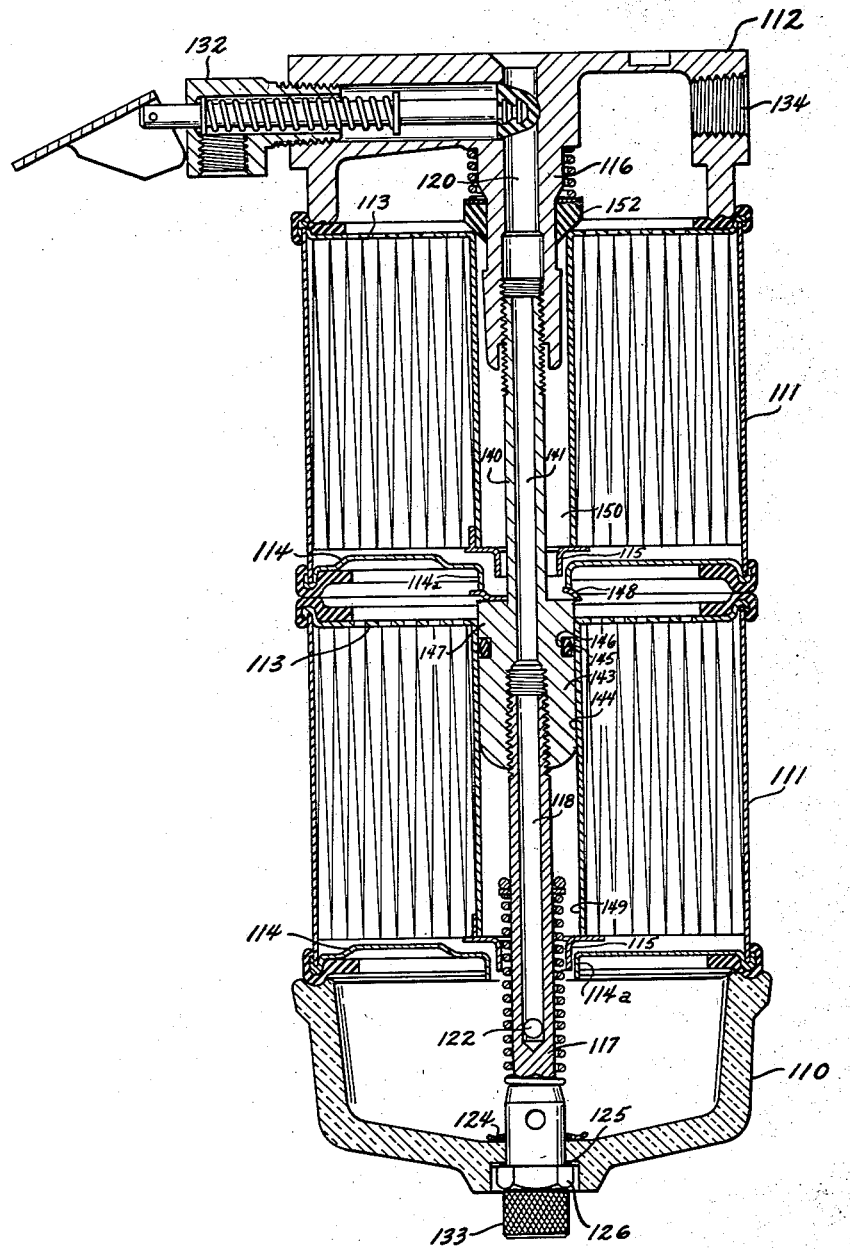
FIG. 4 is a vertical cross section view of the assembly of FIG. 3 adapted to use two identical filter cartridges.
Figure 5:
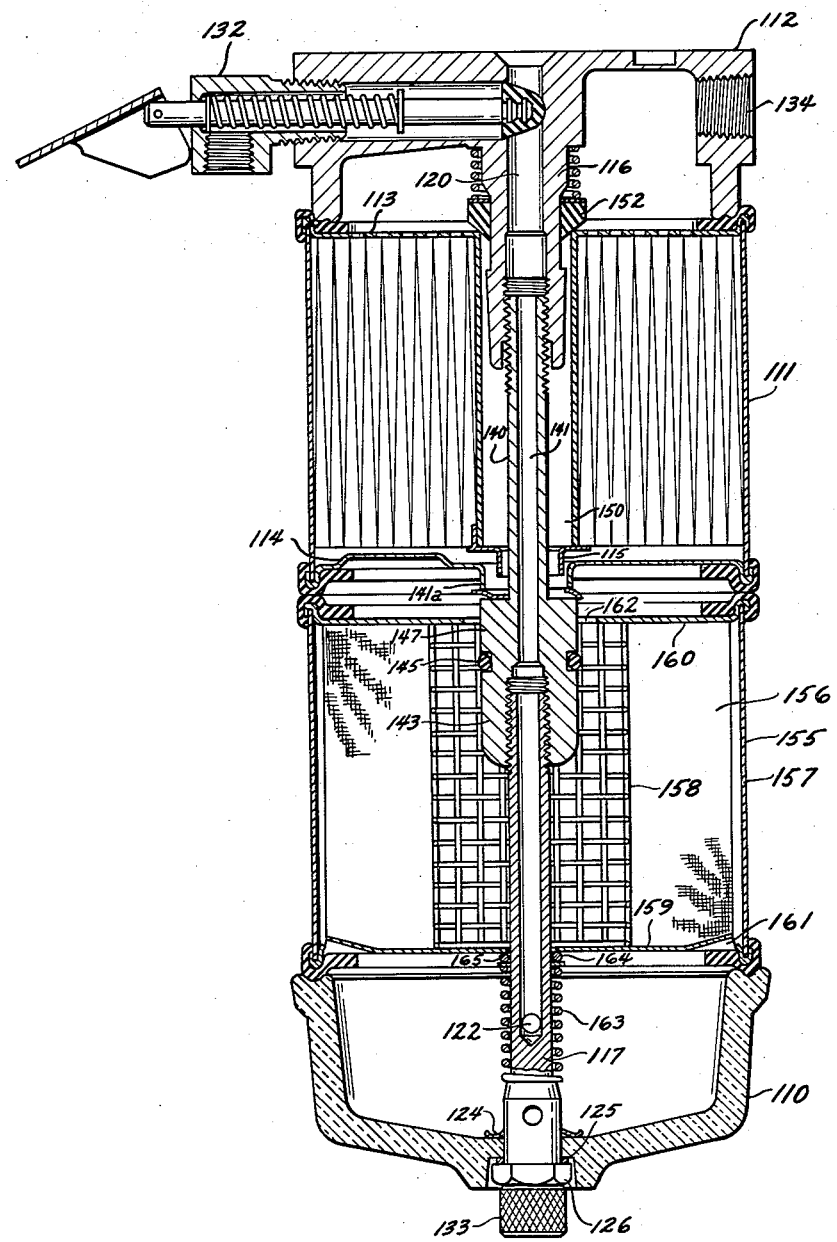
FIG. 5 is a vertical cross section view of the assembly of FIG. 3 adapted to use two dissimilar filter cartridges.

Turning now to the alternative embodiment of my invention as illustrated in FIGS. 3, 4 and 5 and particularly to FIG. 3 wherein there is shown a filter assembly having a bowl-like bottom end cap 110, a form-sustaining replaceable filter cartridge 111 and a base 112, it is noted that these elements are fastened together in a unitary assembly and are substantially identical with the corresponding parts of the assembly shown in FIGS. 1 and 2. Filter 111 is shown, however, with a perforated top plate 113 and an imperforate bottom plate 114 as illustrative of a slightly modified cartridge wherein the fluid flows between rim 114a and the flange 115.

In the alternative embodiment, the base 112 is provided with a central hub or boss 116 which differs primarily from the corresponding part of the previously described embodiment in that no laterally extending outlet ports are provided therein. Additionally, the fastening member 117 differs from fastening member 14 in that it is provided with a central axial passageway 118 which communicates with passageway 120 in boss 116 and is provided with a pair of diametrically opposed (only one of which is shown) outlet ports 122 adjacent its lower end. Member 117 is secured to bowl 110 through the cooperation of spring fastener 124, seal 125 and head 126 so that bowl 110 and fastening member 117 are attached and removed from threaded engagement with boss 116 as a unitary structure. Valve assembly 132, bowl drain assembly 133 and the other structural features of the illustrated embodiment are substantially identical with those illustrated in FIG. 1.

In the embodiment illustrated in FIG. 3, fluid enters the filter assembly through passageway 120 and flows into passageway 118 from whence it enters bowl 110 through outlet ports 122. The fluid then passes upwardly between rim 114a and flange 115, through filter cartridge 111, and out of the filter assembly through outlet port 134. In all other respects the operation and various advantages described for the embodiment of FIGS. 1 and 2 are retained in alternative construction illustrated in FIG. 3.

Turning now to FIG. 4 wherein the alternative structure is shown embodying two identical filter cartridges, it is noted that the modified structure permits easy stacking of filter cartridges to obtain whatever nature of fluid filtering is desired. In addition to the various component parts identified in the discussion of FIG. 3, there is provided the extension stud 140 threaded at its upper end to engage hub 116 and provided with a central passageway 141 extending therethrough. The lower end of extension member 140 is enlarged at 143 to provide a generally cylindrical surface 144 having an O-ring 145 seated therein in groove 146 and to provide a shoulder 147 which supports spring washer 148. The lower end of passageway 141 is threaded to accept fastening member 117. Extension member 140 and fastening member 117 cooperate to position bowl 110 the proper distance from base 112 to accommodate two substantially identical filter cartridges 111. Each filter cartridge is provided with compressible gaskets at each peripheral rim so as to achieve sealing engagement not only between the lower cartridge and the bowl but also between the upper cartridge and the base and between the two cartridges, themselves. The threaded relationships of fastening member 117 and extension member 140 are such as to permit the desired sealing compression of these gaskets. Spring washer 148 engages rim 114a on upper cartridge 113 to support this cartridge when lower cartridge 113 is removed. O-ring 145 is positioned to sealingly engage the inside wall 149 of the lower filter cartridge to prevent improper fluid flow.

The operation of this embodiment utilizes fluid flow downwardly from input passageway 120 through passageway 141 in extension 140 and through passageway 118 in fastening member 117 into bowl 110 through outlet ports 122. The fluid then flows upwardly between rim 114a and flange 115 on lower cartridge 113, flow upwardly through tube 149 being prevented by O-ring 145. After passing upwardly through the lower cartridge, the fluid passes through apertures in spring 148 and between rim 114a and flange 115 on upper cartridge 113, flow upwardly through tube 150 being prevented by filter seal 152, similar to seal 52 of FIG. 1. After passing through upper cartridge 113, filtered fluid leaves the assembly through port 134.

Turning now specifically to FIG. 5 wherein the embodiment of FIG. 4 is shown as used with a filter cartridge 155 of the wound cotton cord type, such a filter cartridge is a standard manufactured item having the same dimensional characteristics as the cartridge 111 but being provided with cotton cord material 156 trapped between outer wall 157 and wire mesh inner wall 158. Cartridge 155 is of the radial flow type and is provided with an imperforate outer wall 157 and in imperforate top wall 160. Bottom wall 159 is notched as at 161 to permit fluid from bowl 110 to pass into cartridge 155 although fluid inlet passages 161 can be provided by any suitable means. Fluid then proceeds generally radially through waste material 156 and out through mesh 158 to pass upwardly through enlarged central opening 162 in top wall 160 and into upper cartridge 111 in the same manner as just described for the embodiment of FIG. 4.

In order to insure proper operation of the cotton cord filter 156 in the filter assembly, there is provided the spring 163 extending about fastening member 117 to force fluid seal 164 into engagement with lower wall 159 of cartridge 155, thereby to seal access opening 165 for member 117 and prevent fluid flow therethrough. This spring can be permanently attached to fastening member 117 so as to permit universal use of my improved fastening assembly with virtually any type of known filter cartridge as well as to permit use of several similar or dissimilar cartridges without modification of the basic filter assembly.

My improved filter assembly, because it can be mounted in inverted position directly upon and below the container for the fluid to be filtered, simplifies the "piping" which must be installed to effect proper fluid system connections. In addition, this mode of direct connection permits the return line of the fluid system to be connected to the filter rather than to the fuel tank thereby placing the return line below the level of the fluid in the tank and insuring that all lines will be kept filled with fluid regardless of system leakage. This advantage becomes more apparent when it is realized that it is extremely difficult to locate an air leak in such a system, whereas a liquid leak is easily detected.

The simplified construction of my filter assembly together with the utilization of a properly positioned transparent sediment and water bowl insure that the filter assembly can be properly used by even inexperienced mechanics without danger of malfunction of the component parts. In addition, the assembly is easily modified to accept two identical or dissimilar filter cartridges, is exceptionally economical to manufacture and provides extreme ease of maintenance. The provision of a single valve to close both the return line and the main fuel inlet line provides additional economy for this filter assembly.

As will be apparent to persons skilled in the art, various modifications and adaptations of the structure above described will become readily apparent without departure from the spirit and scope of the invention, the scope of which is defined in the appended claims.

I claim:

1. A filter assembly for use with a tank having an apertured bottom wall and containing the fluid to be filtered comprising a base, a downwardly extending centrally located hub on said base having a main fuel inlet passageway extending downwardly through said hub, a second inlet passageway in said base extending radially into said hub and intersecting said main fuel inlet passageway, common valve means for closing said first and second passageways at the intersection thereof, means for securing said base against the tank with the main passageway communicating with the inside of the tank through the aperture in the bottom wall thereof, a downwardly extending rim on said base, an outlet port in said base, a replaceable filter cartridge having an upper peripheral rim and having an imperforate cylindrical outer wall forming an outer wall of the assembly, means establishing sealing engagement between the cartridge rim and the rim on said base said filter cartridge having means communicating with said outlet port and an axially extending tublar member forming a part of the cartridge in communication with said main fuel inlet passageway means establishing sealing engagement between said tublar member and said hub, a transparent end cap having a peripheral wall in sealing engagement with the lower rim of said filter cartridge, a threaded fastener extending through said end cap and in threaded engagement with said hub to secure said end cap and filter cartridge to said base, said threaded fastener having a passageway formed therein communicating with the interior of said end cap and extending to the outside thereof to form a water drain passageway, and closure means for said water drain passageway.

2. A filter assembly set forth in claim 1 wherein said common valve means for closing said first and second passageways at the intersection thereof comprises a spring-loaded plunger positioned within said second passageway and having a deformable sealing member carried on the inner end thereof for engagement with the sidewalls of said main passageway and said second inlet passageway, said second inlet passageway being reduced in diameter adjacent said first passageway, and lever means for withdrawing said deformable plug into said second passageway, said deformable plug being of lesser diameter than the diameter of said second passageway.

3. A filter assembly for use with a tank having an apertured bottom wall and containing the fluid to be filtered comprising a base, a downwardly extending centrally located hub on said base having a main fuel inlet passageway extending downwardly through said hub, a second inlet passageway in said base extending radially into said hub and communicating with said main fuel inlet passageway, common valve means for closing said first and second passageways at the juncture thereof, means for securing said base against the tank with the main passageway communicating with the inside of the tank through the aperture in the bottom wall thereof, a downwardly extending rim on said base, an outlet port in said rim, a first replaceable filter cartridge having its upper peripheral rim seated in sealing engagement with said rim on said base and having an imperforate cylindrical outer wall forming the outer wall of the assembly, said first filter cartridge having means communicating with said outlet port and an axially extending tubular member in sealing engagement with said hub, a second replaceable filter cartridge having its upper peripheral rim in sealing engagement with the lower peripheral rim of said first filter cartridge and having an imperforate cylindrical wall forming the outer wall of the assmebly, a transparent end cap having a peripheral wall in sealing engagement with the lower rim of said filter cartridge, and a fastener extending through said end cap and in engagement with said hub to secure said end cap and said filter cartridges to said base, said fastener having a central axial bore communicating with said main fuel passageway and said end cap, said assembly including means preventing fluid flow from said end cap into said first filter cartridge before it passes through said second filter cartridge.

4. The filter assembly as set forth in claim 3 wherein said fastener comprises a first member secured to said hub and having a central axial bore extending therethrough and communicating with said main fuel inlet passageway, said first member having a radially extending shoulder formed thereon in supporting engagement with said first filter cartridge, and a second member secured to the lower end of said first member and having a central axial bore communicating with the axial bore in said first member and with said end cap.

5. A filter assembly for use with a tank having an apertured bottom wall and containing a fluid to be filtered comprising a base, a downwardly extending central hub on said base having a first inlet passageway extending downwardly therethrough, a second inlet passageway in said base extending into said hub and communicating with said first inlet passageway, common valve means for closing said first and second passageways, means for mounting said base against the lower outside wall of the tank with the first inlet passageway communicating with the inside of the tank through an aperture in the bottom wall thereof, a downwardly extending peripheral rim on said base, said base having an outlet port therein, a first filter cartridge having its upper marginal portion in engagement with said rim and having an imperforate outer peripheral wall forming an outer wall of the assembly, said first filter cartridge having means communicating with said outlet port and an axially extending tubular member located inwardly of said outer peripheral wall, means on said hub defining a seat for sealing engagement with said tubular member, a second filter cartridge having an imperforate outer peripheral wall whose upper rim is seated in sealing engagement with the lower rim on said first filter cartridge forming an outer wall of the assembly and a central tubular member disposed inwardly thereof, a transparent end cap having a peripheral wall in engagement with the lower marginal portion of said second filter cartridge, a first fastening member passing through the tubular member on said first cartridge and secured to said hub, said first fastening member having an axial passageway extending therethrough and having an enlarged end in engagement with the lower end of said first filter cartridge, said enlarged end being in sealing engagement with the tubular member on said second filter cartridge, and a second fastening member passing through said end cap and in engagement with the enlarged end on said first fastening member, said second fastening member having an axial passageway communicating with the axial passageway in said first fastening member and said end cap.

References Cited in the file of this patent

UNITED STATES PATENTS

| | | |
|---|---|---|
| 630,870 | Driesbach | Aug. 15, 1899 |
| 1,592,835 | Mock et al. | July 20, 1926 |
| 1,705,042 | Babitch | Mar. 12, 1929 |
| 1,981,397 | Tabozzi | Nov. 20, 1934 |
| 2,007,615 | Ross | July 9, 1935 |
| 2,253,684 | Burckhalter | Aug. 26, 1941 |
| 2,524,336 | Vokes | Oct. 3, 1950 |
| 2,988,225 | Supinger | June 13, 1961 |

FOREIGN PATENTS

| | | |
|---|---|---|
| 741,908 | France | Dec. 20, 1932 |